Dec. 27, 1960 A. G. SHIELDS 2,966,542
PREFABRICATED BUS DUCT
Filed Sept. 4, 1957 3 Sheets-Sheet 1
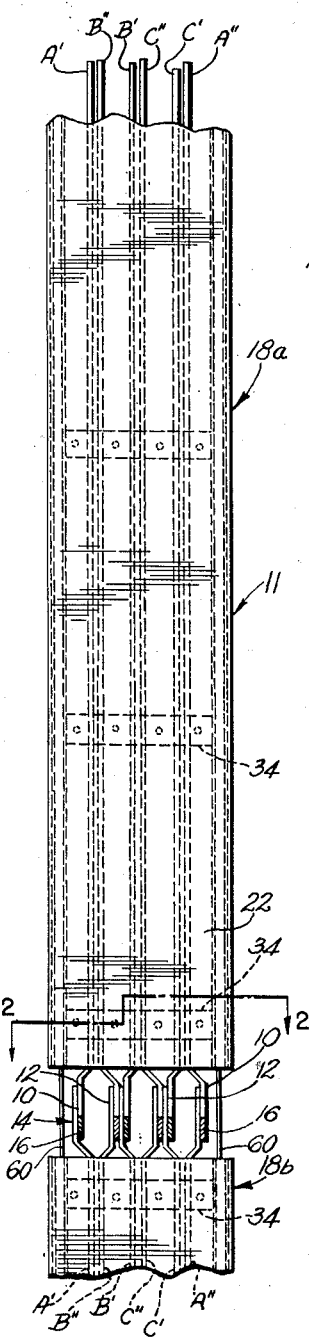
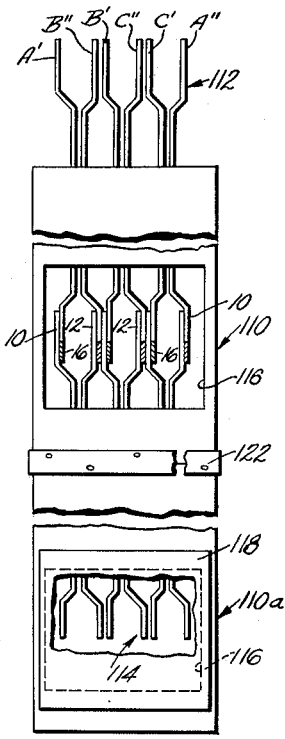
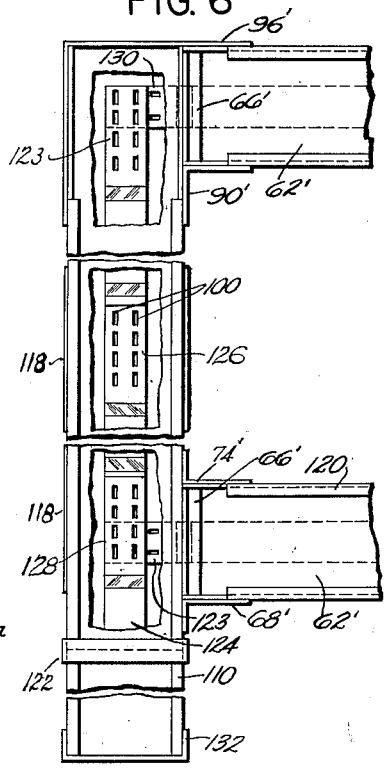
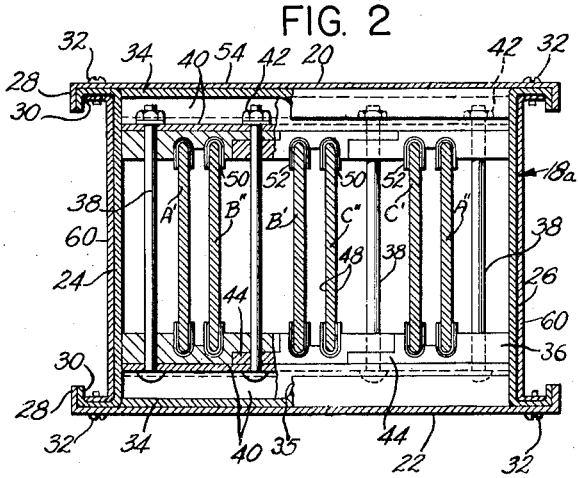
INVENTOR.
ALFRED G. SHIELDS
BY
Paul S. Martin
ATTORNEY Dec. 27, 1960 A. G. SHIELDS 2,966,542
PREFABRICATED BUS DUCT
Filed Sept. 4, 1957 3 Sheets-Sheet 2

INVENTOR.
ALFRED G. SHIELDS
BY Paul S Martin
ATTORNEY

INVENTOR.
ALFRED G. SHIELDS
BY Paul S Martin
ATTORNEY

United States Patent Office 2,966,542
Patented Dec. 27, 1960

2,966,542

PREFABRICATED BUS DUCT

Alfred G. Shields, Clarks Summit, Pa., assignor to Federal Pacific Electric Company, a corporation of Delaware Filed Sept. 4, 1957, Ser. No. 681,949

13 Claims. (Cl. 174—88)

The present invention relates to prefabricated bus ducts of the type comprising an elongated casing with a plurality of bus bars disposed and supported within said casing, and more particularly to an improved bus duct of a standard length adapted to be interconnected to comprise a current-carrying system.

A bus duct frequently extends horizontally from the input power source such as a transformer to various distribution points along the horizontal front. The run may branch from point to point. The bus duct may also be used as a riser in a building having multiple stories. In such installations, bus bar tap-offs may be made at the various floors in a manner to require a T-joint. Elbows are also frequently needed to provide for bends and turns. The bus duct is manufactured in unit lengths, ordinarily of 10 feet each.

Prefabricated bus ducts of the above-mentioned type should have a maximum of flexibility and adaptability to permit of rapid, simple installation under widely different circumstances, otherwise the economy of manufacture and shipping will be offset by the expense and difficulty of installation. Such a bus duct should provide for heavy current-carrying capacity with comparatively small cross-sectional area of the external casing. The terminal portions of the bus bars should be readily accessible, and not be blocked off by portions of the casing. An especially desirable feature is that the bus bars of one duct unit be joinable to mating bus bars of a second duct unit at different angular configurations without the need for complex joining procedures and fixtures. If it is desired to make a turn in the bus duct run in the present state of the art a prefabricated elbow connection must be interposed between two straight lengths of bus duct thus requiring bolting at both ends, whereas only one bolted connection between bus bars is involved in an elbow of an installation made in accordance with the present invention. Moreover, the costly formation of a brazed joint between pieces of bus bars that is involved in manufacture of a prefabricated elbow connection is eliminated by this invention. There is similar saving of one bolted joint and a brazed joint in the T connection of the present invention, as contrasted with a prefabricated T. An improved bus duct would therefore envisage the elimination of special T-joints and elbows, and also avoid the necessity for brazing operations. The bus duct unit of this invention may be manufactured in a standard, simple form, namely with the bus bars protruding an equal distance from the casing, so that they are in line as seen transversely. This feature simplifies field installation of the duct. A further criterion for an improved bus duct is that closure means be readily attached to the existing casing section to form a unitary casing around the connected bus bar units. Such closure means should be of simple pre-fabricated structure. Thus the configuration of the bus bars, the casing and the closure means, as proposed in the present invention, envisage an improved bus duct free from defects of devices now in use.

It is therefore, a feature of the present invention to provide an assembly of bus bars, supporting members and enclosure structures which may be prefabricated so as to minimize the labor involved in the installation, and to permit economical assembly in the field.

Another feature of the present invention is to provide a prefabricated bus duct of simple construction and compact configuration, adapted for rapid linkage to similar standard units to comprise a bus duct system.

Yet another feature of the present invention is to permit of connection between successive lengths of bus duct in such a way as to enable tap-offs to be made conveniently at the time the bus duct is being installed, and also to enable tap-offs to be made at a future date without separating or removing any of the installed bus ducts, and without disturbing the existing bus bar connections.

Still another feature of the invention is the employment of a minimum number of overlapping bus members at a particular connection point, particularly where T connections are made.

A feature of great importance is in the elimination of prefabricated joints, such as elbows and T's. A related feature is in the reduction in the total number of bolted joints required in the elbows and T's of a given installation, with the attendant reduction in the metal-to-metal contact resistances and in the corresponding reduction in time and effort involved in the installation.

An important advantage of the present invention is the elimination of brazing and welding operations to a great extent in the setting up of a bus duct system.

Another object of the present invention is the configuration of bus bars wherein the connection areas are disposed in transverse alignment. The invention also provides means for enabling other than right-angle tap-off connections to be made.

The present invention utilizes simplified closure means associated with the external casing, to form a unitary casing structure around the connected bus bar units. Further features of the invention and its aspects and advantages will become clear from the following detailed disclosure of an illustrated embodiment shown in the accompanying drawings. In those drawings;

Figure 1 is a side view of a portion of a vertical run of bus duct joined by a horizontal run with cover plates removed to reveal a connection between three unit-lengths of bus duct;

Figure 2 is an enlarged cross-section of a duct in Figure 1 along the line 2—2 therein.

Figure 5 is a side view of a straight run of bus duct joined by a branch run with a cover plate partially broken away to reveal a T-connection of three unit-lengths of bus duct and with another cover plate partially broken away;

Figure 6 is a top view of a portion of a typical run of the type of bus duct shown in Figure 5 disclosing respectively a capped end, a T-connection, a straight connection and a right angle elbow connection.

Figure 3:
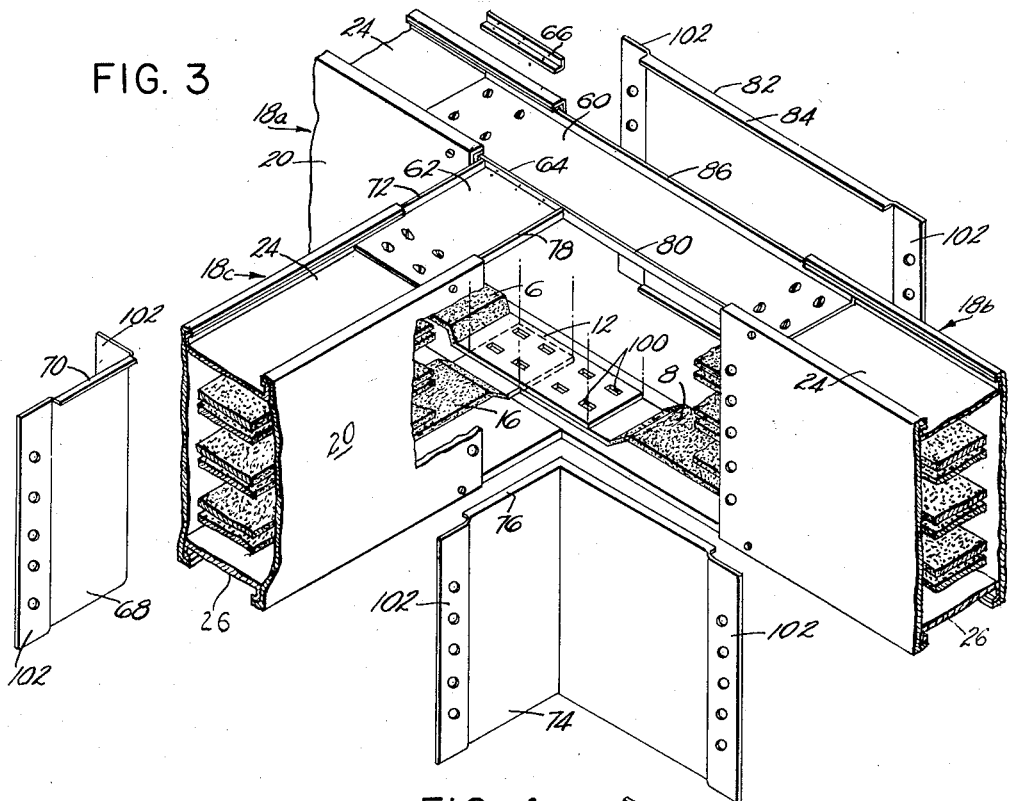
Figure 3 is an isometric showing of a T connection in bus duct with the covers shown in exploded condition so as to expose the bus bar junction.

The embodiment of the invention is described below as applied to a form of paired-phase bus construction, but its application to other types of bus bar arrangements will be readily appreciated.

Referring now to drawings, the device, characterized generally by the numeral 11, comprises an external casing 18 of elongated shape, and disposed therein in spaced relation are the current-carrying bus bars. The bus bars are fixed in position, in relation to each other and in relation to the enclosing duct as disclosed, for example, in the copending application of Paul M. Christenson entitled, "Improved Bus Duct," Serial No. 607,028 filed approximately Aug. 30, 1956 and assigned to the assignee of the present application.

In the present embodiment of the invention, a three phase electrical system is illustrated. However, it will be understood that other systems using different bus bar combinations may be used equally well.

As shown in Figure 1, six bus bars, A', A'', B', B'', C' and C'' are employed. These are disposed in parallel relationship within the casing, 18. Said casing is of sheet metal and may be perforated if desired for improved heat dissipation. The bus bars are of copper or aluminum, of flattened cross-sectional area as shown in Figure 2. The six bus bars shown are designated A', B'', B', C'', C' and A'', these letters being representative of the three input terminals of a three-phase source, A, B and C; and the bar designations also represent three terminals A, B and C of the load and of each tap-off. It will be understood that at the source, and at each load, the bus bars are connected to each other so that bars A' and A'' are joined to provide a single terminal A; bars B' and B'' present a single terminal B, and bars C' and C'' present a single terminal C. Bars A' and B'' are close to each other as a close-spaced pair. Similarly bars B' and C'' form a second pair, and C' and A'' form a third pair.

At both ends of each unit-lengths of bus duct B', B'' and C', C'' are respectively rejoined, but the two A bars of each unit length of bus duct are not connected to each other where that unit-length is joined to another length of bus duct. In an example, the pairs of bars may be spaced from each other by 2 inches, with ¼-inch thick bars 2-inches in width being separated by a face-to-face distance of ¼-inch within the pair. This arrangement provides a low-reactance characteristic as contrasted with the employment of but one heavy conductor or multiple laminated bars per phase which may be here provided between the pairs.

In one embodiment of the invention, Figure 1, casing 18 is open at both ends, the bus bars protruding therefrom, and are thus readily accessible for connecting them with the bus bars of other units of the invention.

As seen in Figure 2, the bus bars are supported in spaced relationship within casing 18 by transverse frame elements 36. Each frame element 36 is cradled by a transverse supporting frame member 34. As seen in Figures 1 and 2, member 34 is a U-shaped in cross section and is disposed transversely at intervals within the casing. It is of metal construction, and is welded along its base to opposite interior walls of the casing, to thereby define a transverse channel, 35. Support member 36 is cradled transversely in channel 35, and is thereby constrained from movement down the length of the casing.

The bus bars, Figure 2, are rigidly retained between upper and lower support members 36, 36, being held in recesses formed in said members, through the action of tightening bolt 38 which forces the bus bars securely into the recesses. A channel 40 may be conveniently formed on support member 36 to retain nut 42 which tightens bolt 38, as shown in Figure 2.

Support member 36 is formed of metal, and to prevent the grounding of the metal bus bars thereto, said bus bars are coated or wrapped with insulation 48. This insulation, for example, is of a first layer of varnished cambric having an adherent layer of permanently tacky adhesive to maintain good thermal contact with the bus bar for effective heat transfer from the bar for heat dissipation; and an outer wrapping of cotton tape, with like adhesive, is applied over the varnished cambric. The wrapping of insulation is used particularly where the enclosing duct is of foraminous metal for efficient ventilation, as of expanded sheet steel, for example. Small patches of insulation are placed between the formed recesses in members 36 and the bus bars. Two layers are used here, a first layer of rubberized insulation 50 and a further layer 52 of a vulcanized fibre, as a precaution against a possible break developing in the wrapped insulation and to absorb mechanical shocks.

As seen in Figures 1 and 5, the terminal section of each bus bar is given an appreciable angular offset, the end portion remaining axially parallel to the main body portion of the bus bar. Thus a pair of bus bars of the same electrical phase such as B'—B'' or the pair C'—C'', which were comparatively widely apart though adjacent within the casing are brought into close proximity at their terminal portions. It will be further noted, Figure 1, that when units of bus duct are placed in end-to-end relation, the bus bars of one unit register with the corresponding bus bars of the second unit in close abutting relation at 10 and 12 (Figure 1) the angular offset of the bars of one duct section have an appropriate configuration to register with the offset of the second duct section. A lap joint is thus readily made by bolts (not shown) connecting the bars through slots 100 (Figure 4).

It should be particularly noted, Figure 1, that the standardized duct units have bus bars with a longer terminal reach at one end than the other. Thus the bars protruding downwardly from the upper bus duct 18a have a markedly shorter terminal area than the bars protruding upwardly from the lower bus duct, 18b. This configuration permits a third set of bus bars 16 (shown in section in Figure 1) to be positioned at the same juncture to form a T-joint with compactness of area and simplicity of connection. Such a T-joint can be added at any time without disturbing the inline connection of the upper and lower bus ducts. The formation of the T-joint is illustrated in greater detail in Figure 3, where it will be noted that the slots 100 are elongated, to provide a certain amount of flexibility in positioning the tap-off duct, 18c. Thus a measure of misalignment of ducts can be compensated for, without the need for complex adjustments.

In the embodiment of the invention illustrated in Figure 3, the bus bars of each individual duct section, 18a, 18c protrude externally from the respective casings. After the T-joint is made as described above, the connection is enclosed by means of pre-fabricated units of sheet metal, 70, 74, 62, 60 and 82, which serve as bridging elements to connect together the individual casings into a unitary structure. These bridging units will be described in greater detail hereafter. Similarly, in Figure 4, an elbow joint is formed by bolting together the protruding bus bars of duct 18a which register with and abut the protruding bus bars of duct 18c. To complete the enclosure in this case, sheet metal bridging elements 90, 62, 88 and 96 are used, in a manner corresponding to the bridging elements shown in Figure 3.

Figure 4:
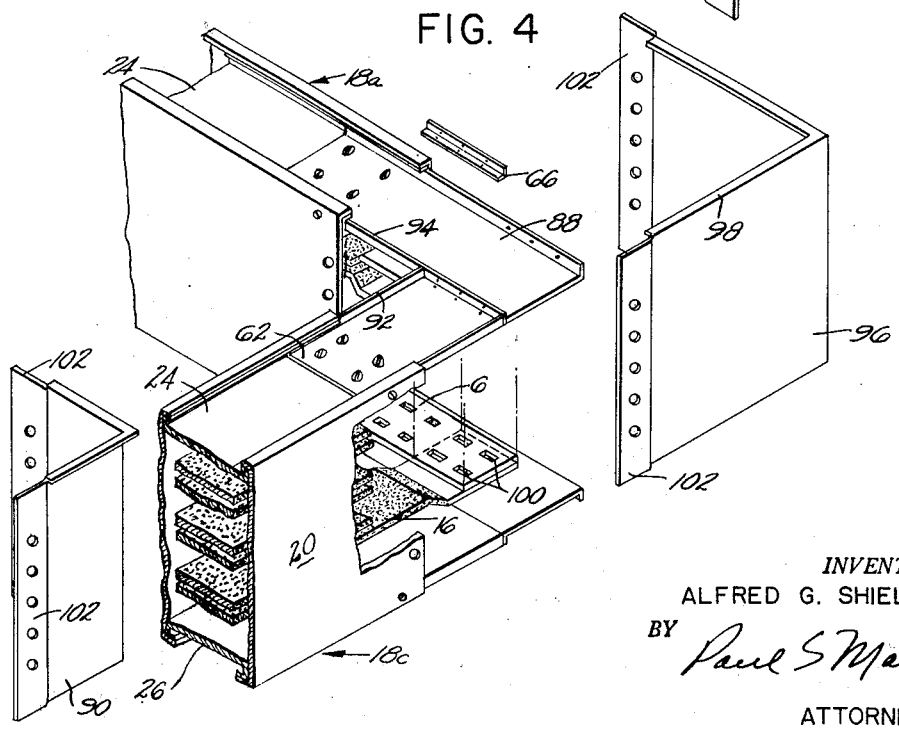
Figure 4 is an isometric showing of a pair of bus duct sections of an alternate type joined in a right angle junction or elbow with the cover plates shown exploded so as to expose the junction. Only one bar connection is shown for reasons of clarity.

It should be particularly noted that, as seen from Figures 3 and 4, before the juxtaposition of the bridging elements, the bus bar elements are in the exposed accessible position, and can be readily aligned to form the T-joint or elbow joint as desired. Thus the present invention eliminates the need for prefabricated joints such as elbows and T's. A related feature is in the reduction in the total number of bolted joints necessary to make good electrical connection. Furthermore, in the making of the elbow joint, Figure 4, there is no need for a brazed joint between pieces of bus bars, as the bars register directly.

In the present invention the terminal or connection making portions of each unit are in line as seen transversely. This makes for simplicity of registering the different units. Thus in both the T-joint and the elbow joint there is elimination of prefabricated parts, also the saving of one bolted joint and a brazed joint, as contrasted with a pre-fabricated T installation.

The closure elements associated with the casing, as provided for in the present invention, are of two general types: splice plates slidable and extendable on the casing, such as 60 and 62 (Figure 3), and individual pre-shaped units, such as 68, 74 and 82 (Figure 3). These are flanged sheet-metal plates, of flat or right-angle construction, which are bolted into place to bridge separate duct units, to complete the enclosure of the connected bus bar sections. It is a feature of the present invention that these enclosure members are furnished in standard shapes and are easily assembled.

It is to be noted that sheet-metal plates may be readily bent to conform with mating duct sections that meet on an angle other than precisely 180° or 90°.

As shown in Figures 1 and 2 the conductors are enclosed in a sheet-metal duct 18 having the top and bottom covers 20 and 22, and side members 24 and 26 formed as channels. Covers 20 and 22 have in-turned edges 28 which overlie edges 30 of side members 24 and 26. Suitable fastening devices 32 unite the enclosing duct into a rigid assembly.

Splice plates 60 slidably positioned in the channel formed by in-turned edges 28 extend the walls 24 and 26, both for structural strength and for the protection they afford as a cover barring accidental access to the bare bolted connections.

Figure 7:
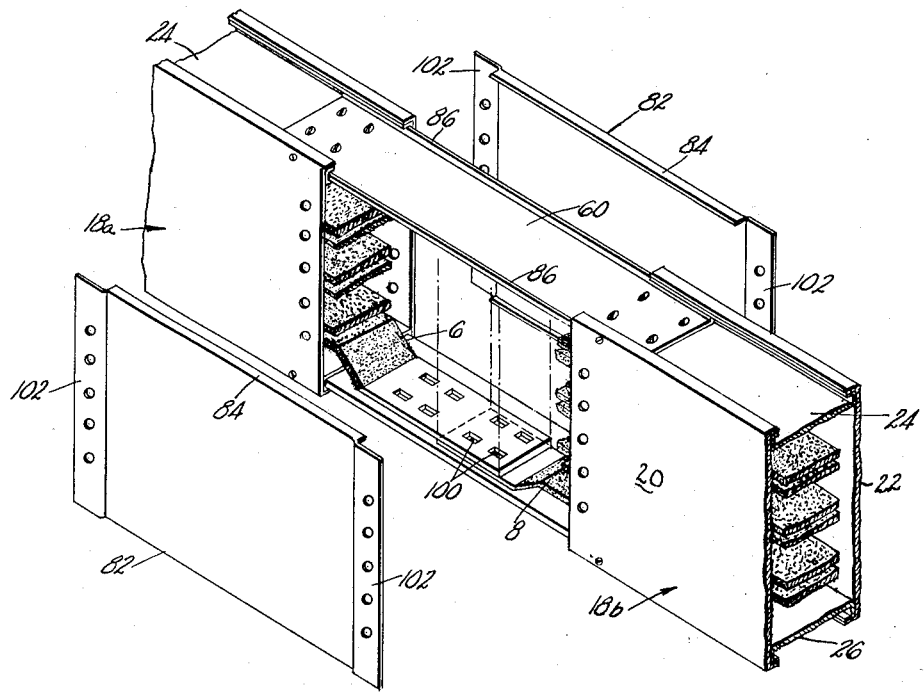
Figure 7 is an isomeric view, partly exploded, with portions broken away for clarity, of two connected units, with cover plates.

Figure 7 shows how a straight connection is made between the bus bars of two adjacent sections of bus duct 18a and 18b. Top and bottom splice plates 60 furnished as part of one of those duct sections are projected to lap over the walls 24 and 26 of the adjacent duct section. The access openings remaining may be closed by simply securing two cover plates 82, one being placed on either side of the duct. The extension of the duct enclosures 20, 22, 24, 26, represented by splice plates 60 and cover plates 82 result in a structurally strong unit that does not depend on the bus bar joints for strength. This duct extension 60, 60, 82, 82, does not contain the bus supporting and locating insulating assemblies provided in the straight lengths of duct.

Figure 3 illustrates formation of a tap-off or T-connection using the standard unit-lengths of bus duct. The standard duct with its splice plate 60 spans the top and bottom walls 24 and 26 of the duct enclosure. An additional splice plate 62 in the standard duct length 18c butts against the flange of splice plate 60. Sheet-metal splice plate 62 may be provided with a right-angle end flange to abut against side wall 64 of splice plate 60 or as shown, an angle 66 may be screw-fastened to both splice plates 60 and 62. The portion of the conductor 6 exposed freely beyond the end of ducts 20, 22, 24, 26 is designed to be sufficiently large to accommodate two bolted joints. One provides a joint-forming terminal area for a lap joint with the straight continuation of duct; the other is for a branch length of duct.

As shown in Figure 3 it will be noted that three different openings remain to be enclosed. One cover member 68, encloses the opening between ducts 18a and 18c. This section is provided with a right-angle turned-in edge 70 which will overlie edge 72 of splice plate 62. Likewise the corner between duct sections 18b and 18c is covered by a right-angle section 74 provided with a turned-in edge portion 76 which overlies edges 78 and 80 of members 62 and 60 respectively. The sole remaining opening existing between duct section 18a and duct section 18b is covered by an essentially flat plate 82 having a turned-in section 84 fitting over edge 86 of member 60.

In Figure 4 there is shown an elbow formed by two duct sections 18a and 18c. It is to be noted that the bolted joint between conductor 16 and conductor 6 is made at the end of conductor 6 rather than on the inside position. The exposed openings are then covered by the use of standard splice plate 62 with which unit-length duct 18a is equipped, and splice plate 88 forming part of the joint-enclosing assembly. Cover plates are coupled together through the use of screws or the like and an angle 66 or with screws and an integral right angle in-turned edge on the end of splice plate 62. The bottom of the lengths 18a and 18c of duct is completed in like fashion. The inside corner of the joint enclosure is covered by a sheet metal member 90 having a right angle end section adapted to fit over the in-turned edges 92 and 94 of members 62 and 88. Likewise there is provided an outside corner cover 96 having turned in edges 98 adapted to fit over the edges of splice plates 62 and 88.

In both the relationships of Fig. 3 and Fig. 4, the ends of the bus bars have bolt holes arranged in such a pattern that when two lengths of duct are joined (either in line as in Fig. 3 or at right angles as in Fig. 4) the holes line up to receive bolts. As a matter of terminology, this pattern may be called "square symmetry." The bus bar joint areas overlap (constrained to do so by the patterns of bolts in the illustrative examples) in what may be called "joint-forming areas." Each joint-forming area (illustrated in Fig. 4 and the tap-off connection of Fig. 3) is a square. The sides of the square equal the bus bar width. The connection between in-line bus duct lengths in Fig. 3 is made beween the same bus bar areas as used in Fig. 4 to make a right-angled connection. Within the latitude afforded by elongated bolt holes, it appears that the centers of joint-forming areas nearest the ends of the bars are spaced from the very ends of the bars by half the width of the bars. Consequently, the centers of such joint-forming areas project beyond all four edges of the duct walls by a distance at least equal to half the width of the narrow walls of the duct. It is by virtue of these proportions that one length of bus duct can be joined at right angles to another like length of bus duct as shown in Fig. 4 without interference between the duct walls. In the case of the T-joint of Fig. 3, the holes in the bus bars of bus duct 18c are in the same pattern, and line up with a like pattern of bolt holes in the tap-off areas in the bus bars of bus duct unit 18a. Each of the bus bars of bus duct 18a thus has two sets of bolt holes both in a pattern of square symmetry; and one pattern (the tap-off pattern) is centered beyond the edges of the duct walls 18a by half of the width of the duct (or a bit more) so that the walls of units 18a and 18c are mutually non-interfering, while the other pattern of holes in the bars of duct length 18a (used for in-line connections) is centered at least an additional bus-bar width beyond the edges of the duct walls.

Another embodiment of the present invention is illustrated by Figures 5 and 6. In this embodiment the casing 110 is open at each end, as in the first embodiment, however, bus bars 112 are recessed at one of the ends, and protrude only from the opposite end. An access opening 116 is provided in casing 110 at the recessed end, so that in-line connections (Figure 5) can be made between the standard duct units. An advantage of this embodiment is that it greatly simplifies the sheet-metal splice plates, as the units abut each other. As shown in Figure 5, after the bus bars of ducts 110 and 110a are connected, access opening 116 is closed by a cover plate 118, and simple connecting plates 122 may be attached over the joint to form a reinforced butt joint. Suitable fasteners such as sheet metal screws may be employed to secure the reinforcing plate to both duct enclosures.

It should be noted that the offset portions 112 and 114 (Figure 5) of the second embodiment are of unequal terminal length, so that the arrangement for overlapping at 10 and 12, Figure 5, is the same as that shown at 10 and 12, Figure 1. Thus space is provided for a transverse joining bus duct at 16.

Such transverse connections are shown at Figure 6, where a T-joint and an elbow joint are illustrated. While the illustration shows single bus bars being connected, as 123 and 130 for the elbow joint, at the top connection, and 123 and 128 for the T-joint, at the lower connection, it is understood that other phase connections are repeated in transverse alignment, for each of the conductors.

It will be appreciated that access opening 116 is suitably enclosed by the transverse duct casings, where elbow joints and T-joints are made. An exposed end may be enclosed by a sheet metal cap 132. The duct sections 110 and 120 may be joined by splice plates 62 secured by angles 66' and fastening means such as screws. Likewise the open side areas may be enclosed by a corner cover 68' (shown in Figure 6). The bottom is enclosed like the top portion.

The elbow connection may be enclosed using the same sheet metal components as shown for the embodiment of Figure 4. These components comprise outside corner 96', inside corner 90', telescoping splice plates 62' and 88' and angle 66' for both the top and bottom and suitable fasteners (not shown).

It should be noted that in the above embodiment, as in the original embodiment, the transverse connections, in the form of T-joints and elbow joints, have been made without the need for pre-fabricated joints. They can be made rapidly and expeditiously at the point of installation. Thus, where the bus duct extends horizontally from the input power source such as a transformer to various distribution points along a horizontal front, a tap-off would be needed at each such point. Similarly, the bus duct may be used as a riser in a building having multiple stories. In such intallations, tap-offs may be made at the various floors in a manner to require a T-joint. In these various cases, the device of the present invention, manufactured in standard units, would furnish the requisite tap-off. An especially important feature is that the bus bar terminals are accessible for connection to transverse matching units, so that in making elbow connections, for example, it is not necessary to incorporate a right-angle section of conductor, in the form of a brazed or welded connection. One bolting operation is sufficient in the present device, whereas if brazing were necessary, it would be requisite that the right-angle segment be bolted at each bus bar connection, necessitating two bolting operations and the attendant disadvantages of additional electrical resistance in the circuit plus the brazing operation. This has been avoided in the present device.

It should also be noted that the elongated slot structure 100, Figure 6, in the bus bar terminal sections allows the use of the present invention in cases where there is slight misalignment and error in location, as the slots permit of slight angular adjustment. Thus costly and laborious adjustments in the field are avoided.

A further point to be noted, is that the construction of the sheet metal bridging units is designed to facilitate the assembly of the duct system with maximum rapidity and simplicity. The various bridge units, illustrated at Figures 3 and 4, are furnished with flange portions, such as 84 of bridge 82, and 76 of bridge unit 74, for example, which abut and overlap the respective casings to which they are affixed, and in addition these bridge units are furnished with an offset perforated flange portion 102, by means of which these are bolted to the casing sections as required. It should be noted that the offset at 102 permits of a more compact construction, as the various bridge units are thereby brought into a closer abutting relation with the casings. For greater rigidity, in forming a unitary structure of the casing, angle 66, Figure 3, is also provided. The unit-length of bus duct is customarily shipped with a pair of splice plates 60, telescoped back over member 24 and secured thereto by bolts 32. In order to install the duct section bolt 32 is removed, splice plate 60 is extended to the final position and bolts 32 are replaced.

It will be observed that the ends and the edges of the bus bars shown are in alignment in the direction perpendicular to the wide faces of the bars, and that one joint-forming area is provided at one end of each bar and two joint-forming areas are provided at the opposite end of the bar. Each joint-forming area is provided with four bolted-joint formations such as the slots shown, or threaded fittings, etc., arranged in a pattern having what may be termed "square symmetry" that enables in-line and crosswide connection of the bus bars, as may be desired. The joint-forming areas are squares, each side of which equals the width of the bus bars.

At one end of the duct (Figs. 5 and 6) or at both ends (Figs. 1, 3, 4 and 7) the joint-forming areas are located at a position of clearance, with their centers spaced from the ends of those duct walls that are perpendicular to the wide bus-bar faces by at least the distance from the center line of the bars to those perpendicular walls. A greater clearance distance may be provided, as duct 18a, Figs. 3, 4 and 7, which affords space for two joints. This same concept applies broadly to bus duct having plural bars arranged with their wide faces in a plane and with the joint areas not in line. Thus, three coplanar bars each two inches wide and spaced one inch edge-to-edge and contained in a duct having side walls spaced one inch from the edges of the nearest bars should have their joint-forming areas centered at least three inches beyond the ends of those walls. Actually, considering one side wall and three bars, spaced apart by one inch, edge-to-edge, the first bar would have its joint-forming area at least three inches beyond that side wall, the second bar would have it joint-forming area correspondingly six inches beyond the same side wall and the third correspondingly nine inches beyond that wall. Such coplanar staggered-end bars can be used in making either in-line connections or elbows.

The foregoing illustrative description of the invention as applied to the particular embodiment shown in the drawings is naturally susceptible of variation and varied substitution and application by those skilled in the art, and accordingly, the appended claims should be broadly construed in a manner consistent with the full spirit and scope of the invention.

What is claimed is:

1. A unit-length of electrical bus duct, including an elongated four-walled rectangular metal casing, plural relatively wide and thin bars extending longitudinally in said casing with the wide faces of the bus bars in successive parallel planes and with the edges thereof in transverse alignment, insulating means gripping and holding said bars spaced from each other and spaced from all four walls of the casing, means constraining said insulating means against movement along the casing, the respective opposite ends of the bus bars being in transverse alignment at a position of clearance beyond the respective ends of all four walls of the metal casing to an extent at least equal to the width of the bus bars plus the space between the transversely aligned edges of the bus bars and the directly opposite wall of the casing, thereby adapting the unit-length of bus duct to be assembled to a like unit length of bus duct either in line therewith or selectively at right angles thereto with the bus bars of such unit lengths over-lapping in a joint area at least equal to the square of the width of the bus bars.

2. A unit-length of electrical bus duct, including an elongated rectangular casing having an opposed pair of narrow walls and an opposed pair of wide walls of coextensive lengths, plural relatively thin and wide bus bars extending longitudinally therein, the bus bars having their wide faces in successive parallel planes perpendicular to the wide walls of the casing and having their edges in transverse alignment, insulating means gripping and fixing said bus bars in spaced relationship to each and to the walls of the casing, means constraining said insulating means against movement along the casing and the bars having transversely aligned joint-forming areas at each end thereof, each joint-forming area being characterized by a set of bolt holes arranged in square symmetry about a center spaced from the respective bus bar end by at least half a bus-bar width, said joint-forming areas being centered beyond all four walls of the duct by a distance at least equal to half the width of the narrow walls.

3. A unit-length of electrical bus duct, including an elongated rectangular casing having an opposed pair of narrow walls and an opposed pair of wide walls of coextensive lengths, plural relatively thin and wide bus bars extending longitudinally therein, the bus bars having their wide faces in successive parallel planes perpendicular to the wide walls of the casing and having their edges in transverse alignment, insulating means gripping and fixing said bus bars in spaced relationship to each and to the walls of the casing, means constraining said insulating means against movement along the casing and the bars having transversely aligned joint-forming areas at each end thereof, each joint forming area being characterized by a set of bolt holes arranged substantially in square symmetry about a center spaced from the respective bus bar end by at least half the bus bar width, said bus bars having an additional like joint-forming area adjacent to one of the aforementioned joint-forming areas and with the centers of said adjacent joint-forming areas spaced apart at least one bus-bar width, said additional joint-forming areas and the joint-forming area at the end of the bus bar remote therefrom being centered beyond the respective ends of all four walls of the duct by a distance at least equal to half the width of the narrow walls.

4. A unit-length of electrical bus duct, including an elongated rectangular metal casing, having four walls whose opposite ends are aligned in respective transverse planes, plural relatively wide and thin bars extending longitudinally in said casing with the wide faces of the bus bars in successive parallel planes and with the edges thereof in transverse alignment, insulating means gripping and holding said bars spaced from each other and spaced from all four walls of the casing, means constraining said insulating means against movement along the casing the respective opposite ends of the bus bars being in transverse alignment and the wide casing walls being formed to afford free access to such ends for connecting the bus bars of two such lengths of duct, in line or at right angles, the bus bars at one end projecting to a transverse plane spaced beyond all four walls of the metal casing by a distance at least equal to the width of the bus bars plus the space between the edges of the bus bars and the directly opposite wall of the casing thereby adapting the unit-length of bus duct to be connected to a like unit length of bus duct with the bus bars of the unit lengths over-lapping in an area at least equal to the square of the width of the bus bars and with the thus joined unit lengths being disposed either end-to-end or selectively at right angles.

5. A unit length of bus duct in accordance with claim 4 wherein the bus bar ends remote from said projecting ends are recessed from the corresponding ends of the walls by an amount approximately equal to the space between the edges of the bus bars and the directly opposite wall of the duct, and wherein openings are provided in those duct walls that are opposite the bus bar edges, such openings being at least as large as the duct cross-section and being located opposite to said recessed bus-bar ends.

6. A unit length of electrical bus duct in accordance with claim 4, wherein all the end portions of said bus bars have bolt-receiving holes therein arranged in a pattern of square symmetry centered at least one-half of a bus bar width from the respective bus bar ends.

7. An electrical bus duct including plural interconnected unit lengths of bus duct, each unit length of bus duct including an elongated rectangular casing having opposed pairs of relatively wide and relatively narrow walls whose ends are disposed in respective transverse planes, plural relatively wide and thin bus bars extending longitudinally therein, said bus bars having their wide faces in successive parallel planes perpendicular to said wide walls of the casing, and having their edges spaced equally from said wide casing walls, and insulating supports gripping and spacing said bus bars from each other and from the walls of the casing, means constraining said insulating supports against movement along the casing, the bus bars having joint-forming areas at each end thereof, each joint-forming area having bolt-receiving holes arranged in square symmetry about a center spaced from the respective end of the bus bar by about one-half of a bus-bar width and the centers of said joint-forming areas being disposed in transverse alignment and at a position of clearance beyond all four walls of the bus duct at least at one end thereof by a distance at least equal to half the width of the narrow walls, the bus bars of successive unit-lengths of bus duct having respective joint-forming areas bolted together as lap joints, and means extending between the casings of successive unit-lengths of bus duct and unifying the casings structurally.

8. An electrical duct bus including plural interconnected unit lengths of bus duct, each unit length of bus duct including an elongated rectangular casing having opposed pairs of relatively wide and relatively narrow walls whose ends are disposed in respective transverse planes, plural relatively wide and thin bus bars extending longitudinally therein, said bus bars having their wide faces in successive parallel planes perpendicular to said wide walls of the casing, and having their edges transversely spaced equally from said wide casing walls, and insulating supports gripping and spacing said bus bars from each other and from the walls of the casing, means constraining said supports against movement along the casing the bus bars having joint-forming areas at each end thereof, each joint-forming area having bolt-receiving holes arranged in square symmetry about a center spaced from the respective end of the bus bar by about one-half of a bus-bar width and the centers of said joint-forming areas being disposed in transverse alignment at a position of clearance beyond all four walls at both ends of the bus duct by a distance at least equal to half the width of the narrow walls, the bus bars of successive unit-lengths of bus duct having respective joint-forming areas bolted together as lap-joints, and bridging plates extending between the casings of successive unit-length of bus duct and enclosing the bus bar joints and unifying the casings structurally.

9. An electrical bus duct in accordance with claim 8 wherein said bus bars in each unit-length of duct have respective additional joint-forming areas with bolt-receiving holes arranged in square symmetry about transversely aligned centers spaced from the centers of the first-mentioned bolt-receiving holes by about the width of the bus bars and wherein the next adjacent ends of the bus duct walls of each unit-length are spaced at least half the width of said relatively narrow walls from the centers of said additional joint-forming areas, two of said unit-lengths of bus duct being joined together at a connection including the additional transversely aligned joint forming areas of one unit-length of bus duct and the bus bars of a third unit-length of bus duct being joined to said one unit-length of bus duct at said first-mentioned joint forming areas thereof.

10. An electrical bus duct including plural unit lengths of bus duct in accordance with claim 7, wherein each unit-length of bus duct has the centers of the joint-forming areas of bus bar ends remote from said one ends of the bus bars inwardly spaced from the next adjacent ends of the bus duct walls by a distance at least equal to half the width of said narrow walls, one of the relatively wide walls of the casing having an opening opposite said inwardly spaced bus bar ends, said opening being at least as large as the casing cross-section, and two of said unit-lengths of bus duct being connected together at right angles at said opening.

11. An electrical bus duct including plural interconnected unit lengths of bus duct, each unit length of bus duct including an elongated rectangular casing having opposed pairs of relatively wide and relatively narrow walls, whose ends are disposed in respective transverse planes, plural relatively wide and thin bus bars extending longitudinally therein, said bus bars having their wide faces in successive parallel planes perpendicular to said wide walls of the casing, and having their edges equally spaced from said wide casing walls and their ends transversely aligned and insulating supports gripping and spacing said bus bars from each other and from the walls of the casing, means constraining said insulating supports against movement along the casing, the transversely aligned ends of the bus bars of at least one end of the duct projecting beyond the ends of said the next adjacent duct walls by at least the width of the bus bars plus the space between the edges of the bus bars and the directly opposite casing walls, the bus bars of successive unit-lengths of bus duct having their ends connected as lap joints, and means extending between the casings of successive unit-lengths of bus duct and unifying the casings structurally.

12. Bus duct apparatus including plural, unit-lengths of bus duct in accordance with claim 1 joined together with the said bus bar end portions thereof joined together as lap joints, and bridging plates extending between the casings thereof effective to unite the casings structurally and to enclose the bus bar connections.

13. Bus duct apparatus including at least three unit-lengths of bus duct in accordance with claim 1 wherein two of said unit lengths of bus duct are connected in line, with the bus bars thereof connected at lap joints, and wherein the third unit-length of bus duct is connected to said two unit lengths at right angles thereto with the bus bars thereof forming lap joints to the bus bars of one of said two unit lengths adjacent to the lap joints connecting said two-unit-lengths of bus bars, and bridging plates structurally joining the casings of said three unit lengths of bus duct together and enclosing the lap joint thereof.

References Cited in the file of this patent

UNITED STATES PATENTS

| | | |
|---|---|---|
| 2,407,142 | Cole et al. | Sept. 3, 1946 |
| 2,430,557 | Carlson | Nov. 11, 1947 |
| 2,453,314 | Hammerly | Nov. 9, 1948 |
| 2,653,991 | Dyer et al. | Sept. 29, 1953 |
| 2,783,297 | Badeau | Feb. 26, 1957 |
| 2,871,285 | Fouse et al. | Jan. 27, 1959 |

OTHER REFERENCES

Publication I: Bulldog Plug-In Bustribution Duct for Branch Circuits, Types "BD" and "BDA," bulletin 427–2 and 3, revised June 1946, published by Bulldog Electric Products Co., Detroit, Michigan (page 7 relied on).